Jan. 13, 1959    A. A. M. VALANTIN    2,868,532
MINING AND LOADING MACHINE HAVING A SCREENING PLATE
Filed Jan. 2, 1957    2 Sheets-Sheet 1

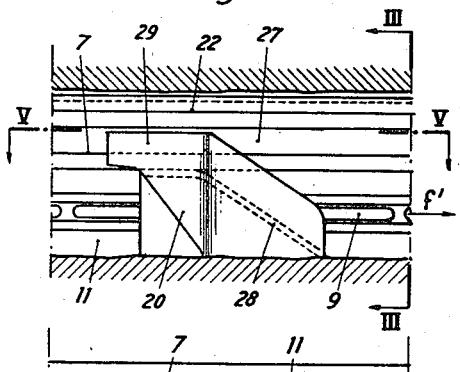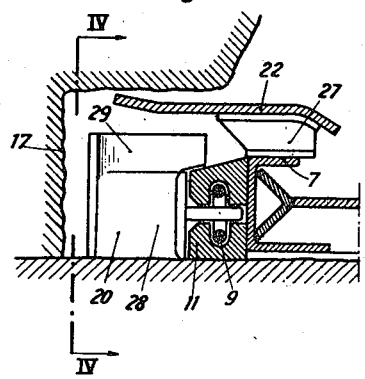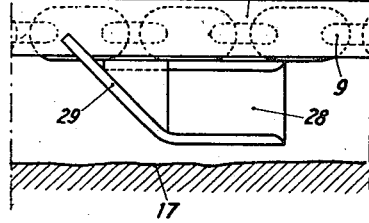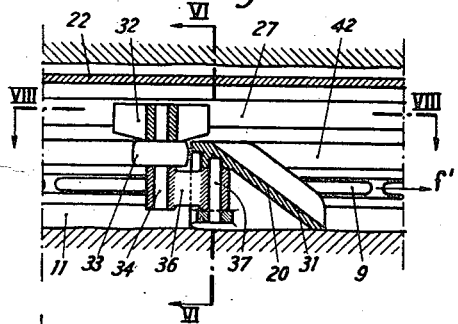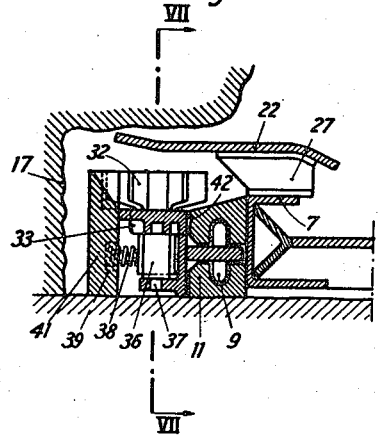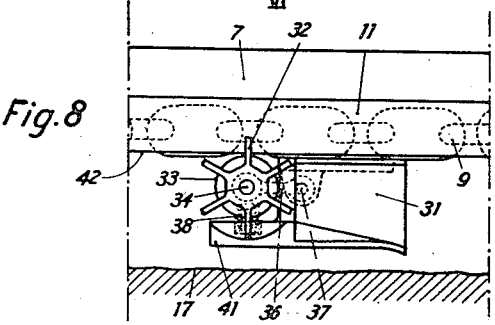

United States Patent Office 2,868,532
Patented Jan. 13, 1959

2,868,532

MINING AND LOADING MACHINE HAVING A SCREENING PLATE

Alfred Alphonse Marie Valantin, Barlin, France

Application January 2, 1957, Serial No. 632,118

Claims priority, application France January 3, 1956

6 Claims. (Cl. 262—28)

The present invention relates to improvements in so-called cutting and loading machines.

The present invention relates to machines of this type which are used in mining operations to cut a seam of coal or other products, the said machines themselves loading all or some of the products which they have cut.

The invention aims more particularly at improvements in machines of the type having a conveyor surrounded by a cutting chain carrying tools, the said chain contriving a trench level with the bottom of the seam to be cut as the lateral advancement of the conveyor into the seam proceeds, the said trench allowing the conveyor to engage under the seam and initiate the collapse thereof, the said seam, when it collapses, then falling directly into the conveyor, which sets in motion the products thus received, and loads them on to other normal conveying devices.

A first improvement according to the invention consists in providing, over the whole length of the cutting or conveying side, a screening plate so disposed and dimensioned as to counteract the entry into the trench of the products cut.

A second improvement consists in attaching the screening plate at a distance above the cutting or conveying side, in such a way as to provide between this plate and this side a passage through which the fines (that is to say the reduced products and dust) which have fallen into the trench can be removed towards the conveyor.

A third improvement consists in providing the cutting chain with scrapers so arranged as to pick up the fines which have fallen into the trench, and return them to the conveyor.

The efficiency of machines of the type under consideration has been greatly increased in consequence of these improvements, and of other improvements which will be apparent from perusal of the following description, since on the one hand the machines can be made to advance more rapidly into the seam, and on the other hand stoppages due to the entry into the trench of products cut or to choking of the trench by the progressive accumulation of fines are avoided.

The improvements briefly indicated above, and others explained in detail in the following description and with reference to the attached drawings must be understood to be novel features arising both from the description and the drawings, and are within the scope of the present invention.

In the attached drawings:

Fig. 3 is a partial transverse section, on a larger scale, corresponding to the section III—III in Fig. 2;

Fig. 4 is a partial longitudinal section, corresponding to the section IV—IV in Fig. 3;

Fig. 5 corresponds to a section along the line V—V in Fig. 4;

Fig. 6 is a partial transverse section similar to Fig. 3. It shows another method of embodiment of the invention, and corresponds to a section in accordance with the section VI—VI in Fig. 7;

Fig. 7 is a partial longitudinal section in accordance with the section VII—VII in Figure 6; and Fig. 8 corresponds to a section in accordance with the section VIII—VIII in Fig. 7.

Figure 1:
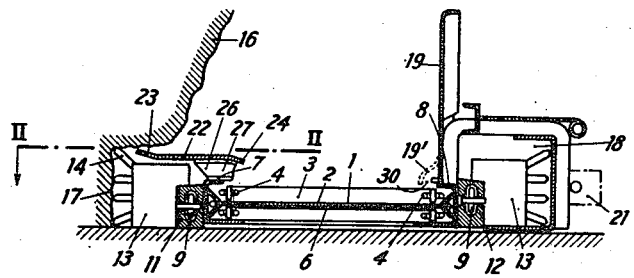
Fig. 1 shows a transverse section through a cutting and loading machine arranged in accordance with the features of the present invention.
Figure 2:
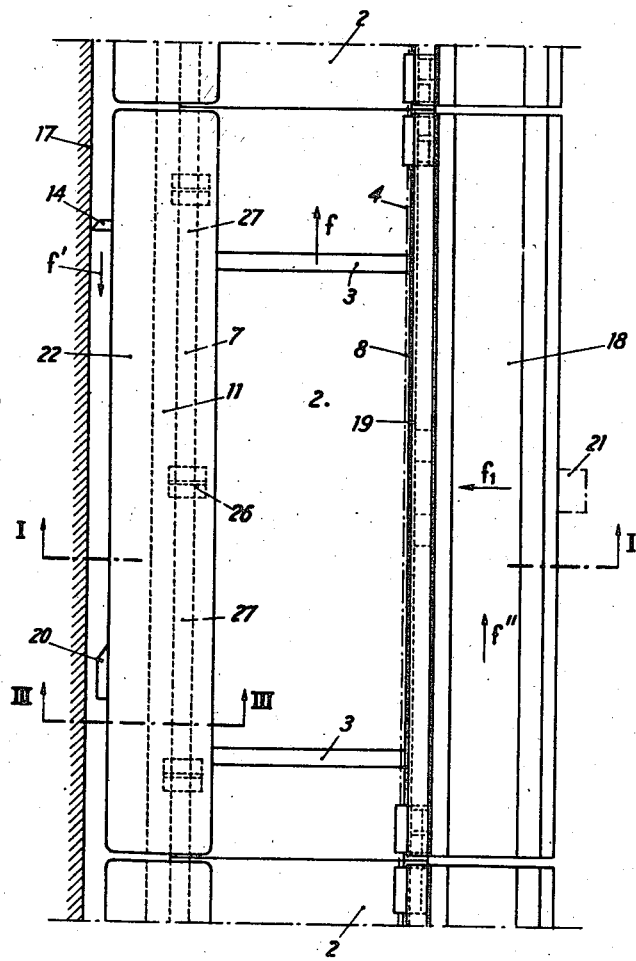
Fig. 2 shows a plan view of the machine illustrated in Fig. 1, the seam being sectioned to the level II—II in the latter figure.

With reference to Figs. 1 and 2, a cutting and loading machine will be seen, comprising a conveyor 1 consisting of a series of tubs or troughs such as 2. This conveyor is of the type having scrapers, which are shown at 3, and which are displaced by the chains 4, for example in the direction $f$. The intermediate plate of the conveyor is shown at 6, and the longitudinal sides thereof at 7 and 8.

A chain 9, known as the cutting chain, moves round the conveyor. At the ends of the conveyor, this chain runs round wheels, not illustrated, and passes from one side to the other of the conveyor in longitudinal guides 11 and 12 attached to the sides thereof. Tool-carrier blocks 13, provided with tools such as 14, are attached at intervals to the cutting chain 9, the said tools being so arranged and disposed as to contrive, level with the bottom of the seam 16, a trench 17 higher than the conveyor. On the opposite side of the seam, the conveyor is provided with a tunnel 18 in which the tool-carriers 13 can circulate, as also can scrapers such as 20, which are also driven by the chain 9, and which will be described later. In certain forms of embodiment, the tunnel 18 is longitudinally open on the side towards the conveyor, in order to allow the fines driven into the tunnel to be removed towards the conveyor. However, in the form illustrated, the tunnel is closed on the side towards the conveyor by raised portions 19, which are preferably detachable; the fines are then removed on the cutting side with the aid of means which will be considered later. Horizontal jacks, such as 21, are disposed at intervals along the conveyor in order to cause the latter to move laterally towards the seam, that is to say in the direction of the arrow $f_1$. It will furthermore be supposed, for the purpose of clarification, that the cutting chain 9 circulates in the direction $f'$ on the cutting side, and in the direction $f''$ on the side towards the tunnel.

A screening plate 22 is provided, according to the invention, on the cutting side of the conveyor. The said screening plate is substantially parallel to the conveyor, and preferably has a raised portion 23 on the side towards the seam, and a downwardly directed portion 24 on the side towards the conveyor. The screening plate 22 is disposed slightly below the highest level of cut of the tools 14, in such a manner as to be capable of engaging in the trench 17 as penetration of the tools 14 into the seam progresses. The screening plate 22 completely covers the tool-carrier blocks 13, and extends above the conveying path of the conveyor; the said plate is furthermore attached to the longitudinal side 7 of the conveyor by way of supports such as 26, between which there are longitudinal apertures 27 providing communication between the trench and the conveying path of the conveyor. The screening plate 22 is preferably bolted to the conveyor, in order that it may be detached.

Figs. 3 to 5 show in greater detail one of the scrapers 20 which are attached at intervals to the cutting chain 9, for example by attachment to a special link thereof. Each scraper 20 takes the form of a blade comprising a lifting ramp 28 and a deflector portion 29. The ramp 28 rises in the opposite direction to that in which the chain 9 moves, and the deflector portion 29 converges towards the conveyor, also in the opposite direction to that in which the chain 9 moves. Under these conditions, when the said chain moves (in the direction f' in the example illustrated), the ramp 28 picks up the fines which have fallen into the trench, and the deflector portion 29 returns the said fines to the conveyor; the said fines then pass through the apertures 27, and finally fall into the conveyor, which removes them.

The use of scrapers of the preceding type has already been proposed before the present invention, but in the absence of a screening plate 22 these scrapers could fulfil their function of freeing the trench only if the machine was caused to advance into the seam at a sufficiently low speed for the conveyor not to be excessively loaded with broken-down products and to overflow into the trench; otherwise, a large quantity of products of all sizes would enter the trench, and the cutting chain would be jammed. Furthermore, independently of overflow of the conveyor, there will also be the risk of local collapse of the seam directly above the tool-carrier blocks 13, and this collapse would involve the same disadvantage. It is consequently clear that the addition of a screening plate 22 is very advantageous as regards increase in output, since on the one hand it allows the speed of advancement of the machine to be increased, and on the other hand reduces the number of stoppages of the machine for the purpose of freeing the trench: two sources of increase in output.

In consequence of the presence of the screening plate 22, the trench is only obstructed by fines produced by the scraping action of the tools 14 in the seam. It is important to remove these fines so that they do not accumulate in the trench until the cutting chain becomes jammed. The combined use of scrapers 20 and a tunnel 18 open on the side towards the conveyor (that is to say without an obturative raised portion 19) allows the fines to be removed up to a certain point, since the scrapers 20 can carry the fines with them outside the trench, and bring the said fines into the open tunnel 18, where the said fines can be removed towards the conveyor in consequence of the deflecting action of the scrapers 20, and passing through the aperture by way of which the tunnel communicates with the conveyor. In order that removal may be satisfactory under these conditions, it is however necessary for the fines not to be present in too great a quantity, and for the conveyor not to overflow into the tunnel via the communicating aperture. This latter disadvantage can be mitigated by the use of a rised portion 19 having a bent portion such as 19' (see Fig. 1), which forms a longitudinal aperture 30 above the conveyor, while counteracting the diversion of the products from the conveyor into the tunnel; however, the limitation in the quantity of fines in the trench necessitates a limitation in the speed of advncement of the machine, and consequently a limitation in the output thereof.

The presence of the apertures 27 allows the machine to be caused to advance much more quickly without the risk of the trench becoming choked, since the fines present there are removed by a more direct route: they are lifted and pushed by the scrapers 20 into the apertures 27, and fall from there into the conveyor. It will be noted that the fines pass from the trench to the conveyor via a channel bounded by metallic walls, which can be very smooth, and thus only offer low resistance to sliding of the fines, and facilitate the work of removal effected by the scrapers 20.

In the method of embodiment illustrated in Figs. 6 to 8, scrapers 20 comprising a lifting ramp 31 are provided, as also is a bladed wheel 32 fast with a roller 33. The assembly consisting of the wheel 32 and the roller 33 is mounted on a shaft 34 carried by an arm 36. The latter is mounted on a shaft 37 whereof the ends are engaged in holes provided on the body of the scraper; the arm 36 can thus pivot about the shaft 37. Furthermore, a compression spring 38, engaging in a hole 39 provided in the cheek 41 of the scraper, bears continuously on the arm 36, and applies the roller 33 against the lateral flank 42 of the guide 11.

Under these conditions, when the scraper 20 is driven in the direction f' by the cutting chain 9, the roller 33 rolls on the flank 42, and in the course of its rotation drives the bladed wheel 32. The result of this is that as the operations of picking up the fines from the bottom of the trench by the lifting ramp 31, and of conveying the said fines towards the blades of the rotating wheel 32, progress, the said fines are pushed by the said blades towards the conveyor, into which the said fines fall, after having passed through the longitudinal apertures 27.

If the conveyor comprises a large number of tubs mounted end to end, the said tubs are successively articulated to one another, or mounted end to end in such a way as to permit a small inclination, in a vertical plane, of each tub relative to the preceding one, this inclination being obtained by a small rotation of the tub about a transversal axis passing along the terminal edge of the section of the intermediate plate 6 of the preceding tub. Thus the machine may follow undulations in the ground, and always attack the seam at the bottom thereof. In this case, the screening plate 22 will also consist of several sections, one per tub, and these sections will be slightly shorter than the respective tubs in order not to hinder the relative inclinations of the successive tubs.

It is to be understood that the invention is not limited to the examples of embodiment which have just been described; on the contrary, it is of general scope, and capable of variants and modifications, and numerous variants in embodiment can be envisaged without departing from the scope of the present invention.

What I claim is:

1. A mining and loading machine comprising a conveyor having a longitudinal side extending along a seam to be mined; a cutting chain mounted to travel along said longitudinal side; a guide for guiding said cutting chain along said longitudinal side; a screening plate extending laterally beyond said guide and mounted above the same and said longitudinal side to form, between this plate on the one hand and said guide and said longitudinal side on the other hand, a passage extending along the conveyor; tools operatively connected to said cutting chain and extending laterally beyond and some of them vertically above said screening plate so that, as the machine is laterally advanced into the seam, said tools undercut the seam and form therein a trench into which the screening plate engages and substantially prevents that material broken down from the undercut seam falls into the trench; and scrapers attached to said cutting chain and adapted to pick up cut and broken pieces and dust of the seam which have fallen into the trench and transfer them, through said passage, to the conveyor.

2. A machine according to claim 1, wherein the screening plate has a raised portion along its side facing the seam, and a downwardly directed portion along its side facing the conveyor.

3. A mining and loading machine comprising a conveyor having a longitudinal side extending along a seam to be mined; a cutting chain mounted to travel along said longitudinal side; a guide for guiding said cutting chain along said longitudinal side; a screening plate extending laterally beyond said guide and mounted above the same and said longitudinal side to form, between this plate on the one hand and said guide and said longitudinal side on the other hand, a passage extending along the conveyor; tools operatively connected to said cutting chain and extending laterally beyond and some of them vertically above said screening plate so that, as the machine is laterally advanced into the seam, said tools undercut the seam and form therein a trench into which the screening plate engages and substantially prevents that material broken down from the undercut seam falls into the trench; and scrapers attached to said cutting chain, each of which is provided, with a lifting ramp inclined to rise from approximately the bottom of the trench to approximately the inferior level of said passage in the opposite direction to that in which the cutting chain travels, and with a deflector portion located rearward of said lifting ramp, extending in said passage and oriented to converge towards the conveyor in said opposite direction.

4. A mining and loading machine comprising a conveyor having a longitudinal side extending along a seam to be mined; a cutting chain mounted to travel along said longitudinal side; a guide for guiding said cutting chain along said longitudinal side; a screening plate extending laterally beyond said guide and mounted above the same and said longitudinal side to form, between this plate on the one hand and said guide and said longitudinal side on the other hand, a passage extending along the conveyor; tools operatively connected to said cutting chain and extending laterally beyond and some of them vertically above said screening plate so that, as the machine is laterally advanced into the seam, said tools undercut the seam and form therein a trench into which the screening plate engages and substantially prevents that material broken down from the undercut seam falls into the trench; and scrapers attached to said cutting chain, each of which is provided with a lifting ramp inclined to rise from approximately the bottom of the trench to approximately the inferior level of said passage in the opposite direction to that in which the cutting chain travels, with a bladed wheel located rearward of said lifting ramp, having its under face approximately at the inferior level of said passage and mounted to rotate about an axis, and with means responsive to the movement of said cutting chain to rotate the bladed wheel in such a sense that the forward part of the bladed wheel is moved toward the conveyor.

5. A machine according to claim 4, wherein the means to rotate the bladed wheel comprise a roller mounted on the scraper to roll on the longitudinal side of the said guide, and connected to the bladed wheel to rotate therewith.

6. A mining and loading machine comprising a conveyor having a longitudinal side extending along a seam to be mined, said conveyor consisting of a succession of tubs mounted end to end in such a way as to permit a small inclination of each tub relative to the preceding one; a cutting chain mounted to travel along said longitudinal side; a guide for guiding said cutting chain along said longitudinal side; a screening plate extending laterally beyond said guide and mounted above the same and said longitudinal side to form, between this plate on the one hand and said guide and said longitudinal side on the other hand, a passage extending along the conveyor, said screening plate consisting of a plurality of sections, one per tub of the conveyor, each section being slightly shorter than the corresponding tub; tools operatively connected to said cutting chain and extending laterally beyond and some of them vertically above said screening plate so that, as the machine is laterally advanced into the seam, said tools undercut the seam and form therein a trench into which the screening plate engages and substantially prevents that material broken down from the undercut seam falls into the trench; and scrapers attached to said cutting chain and adapted to pick up cut and broken pieces and dust of the seam which have fallen into the trench and transfer them, through said passage, to the conveyor.

References Cited in the file of this patent

UNITED STATES PATENTS

| 1,638,507 | O'Toole | Aug. 9, 1927 |
| 2,696,374 | Lobbe | Dec. 7, 1954 |

FOREIGN PATENTS

| 692,884 | Great Britain | June 17, 1953 |